US012271039B2

United States Patent
Hagen et al.

(10) Patent No.: US 12,271,039 B2
(45) Date of Patent: Apr. 8, 2025

(54) OPTICAL FIBER POLISHER WITH CONTROLLED PLATEN STOPPING POSITION

(71) Applicant: Domaille Engineering, LLC, Rochester, MN (US)

(72) Inventors: John P. Hagen, Plainview, MN (US); Dennis J. Anderson, Zumbro Falls, MN (US); Gregory A. Schumacher, Plainview, MN (US); Jill B. Christie, St. Charles, MN (US); Paul Fishbaugher, Rochester, MN (US); Timothy E. Kanne, Rochester, MN (US)

(73) Assignee: Domaille Engineering, LLC, Rochester, MN (US)

( * ) Notice: Subject to any disclaimer, the term of this patent is extended or adjusted under 35 U.S.C. 154(b) by 671 days.

(21) Appl. No.: 17/554,947

(22) Filed: Dec. 17, 2021

(65) Prior Publication Data

US 2023/0194794 A1    Jun. 22, 2023

(51) Int. Cl.
*G02B 6/38* (2006.01)
*B24B 19/22* (2006.01)

(52) U.S. Cl.
CPC .......... *G02B 6/3863* (2013.01); *B24B 19/226* (2013.01)

(58) Field of Classification Search
CPC ............................ B24B 19/226; G02B 6/3863
See application file for complete search history.

(56) References Cited

U.S. PATENT DOCUMENTS

| | | | |
|---|---|---|---|
| 5,741,171 A | 4/1998 | Sarfaty et al. | |
| 6,074,275 A * | 6/2000 | Yashiki | B24B 49/04 451/5 |
| 6,250,997 B1 * | 6/2001 | Hatano | B24B 37/005 451/259 |
| 6,346,036 B1 * | 2/2002 | Halley | B24B 37/26 451/458 |
| 6,741,337 B2 | 5/2004 | Katakura et al. | |
| 6,755,719 B2 | 6/2004 | Yoshida et al. | |
| 6,981,908 B2 | 1/2006 | Enomoto et al. | |
| 7,103,254 B2 | 9/2006 | Yamada | |
| 7,165,894 B2 | 1/2007 | Arai et al. | |
| 7,169,026 B2 | 1/2007 | Minami et al. | |
| 7,494,402 B2 | 2/2009 | Yamada et al. | |
| 7,542,648 B2 | 6/2009 | Yamada et al. | |
| 7,738,760 B2 | 6/2010 | Fredrickson et al. | |

(Continued)

FOREIGN PATENT DOCUMENTS

| | | |
|---|---|---|
| CN | 210732122 U | 6/2020 |
| CN | 212653260 U | 3/2021 |

(Continued)

OTHER PUBLICATIONS

International Search Report and Written Opinion from PCT/US22/52114, 9 pages, Mar. 21, 2023, Shane Thomas.

*Primary Examiner* — Joel D Crandall
(74) *Attorney, Agent, or Firm* — Dicke, Billig & Czaja, PLLC (57) ABSTRACT

An optical fiber polisher includes a polishing mechanism, a platen, and a memory for storing operational parameters entered by a user. The optical fiber polisher includes a processor to control a stopping position of the platen at an end of a polishing step based on the operational parameters.

18 Claims, 8 Drawing Sheets

(56) References Cited

U.S. PATENT DOCUMENTS

| | | |
|---|---|---|
| 8,708,776 B1 | 4/2014 | Frazer |
| 9,211,627 B2 | 12/2015 | Andou et al. |
| 9,915,791 B2 | 3/2018 | Woodward et al. |
| 9,983,364 B2 | 5/2018 | Towfiq et al. |
| 10,042,126 B2 | 8/2018 | Taira et al. |
| 10,981,256 B2 | 4/2021 | Aoki et al. |
| 10,981,257 B2 | 4/2021 | Christie et al. |
| 11,415,755 B2 | 8/2022 | Yang |
| 11,571,784 B2 | 2/2023 | Shibutani |
| 11,602,820 B2 | 3/2023 | Sugita et al. |
| 2003/0060141 A1 | 3/2003 | Sommer et al. |
| 2003/0176149 A1* | 9/2003 | Yoshida ............... B24B 19/226 451/10 |
| 2003/0182015 A1* | 9/2003 | Domaille .............. B24B 37/005 451/5 |
| 2004/0106362 A1 | 6/2004 | Kume et al. |
| 2006/0147160 A1 | 7/2006 | Schmidt et al. |
| 2015/0030291 A1 | 1/2015 | Webb et al. |
| 2020/0156208 A1 | 5/2020 | Wong |
| 2020/0278500 A1* | 9/2020 | Christie ................. B24B 51/00 |
| 2021/0394328 A1* | 12/2021 | Hemes .................. B24B 27/033 |
| 2022/0212313 A1 | 7/2022 | Yamada |
| 2022/0390686 A1 | 12/2022 | Furuta |
| 2023/0039931 A1 | 2/2023 | Yamada et al. |

FOREIGN PATENT DOCUMENTS

| | | |
|---|---|---|
| CN | 214292308 U | 9/2021 |
| CN | 217914729 U | 11/2022 |
| JP | 2004261898 A | 9/2004 |
| JP | 2005111662 A | 4/2005 |
| JP | 2006259629 A | 9/2006 |
| JP | 2008257222 A | 10/2008 |
| JP | 4195644 B2 | 12/2008 |
| JP | 2009125854 A | 6/2009 |
| JP | 4814844 B2 | 11/2011 |
| JP | 4823256 B2 | 11/2011 |
| JP | 2019010682 A | 1/2019 |
| WO | 2011092744 A1 | 8/2011 |
| WO | 2011092745 A1 | 8/2011 |

* cited by examiner

OPTICAL FIBER POLISHER WITH CONTROLLED PLATEN STOPPING POSITION

BACKGROUND OF THE INVENTION

A fiber optic cable generally includes a protective or supporting material through which optical fibers extend. The cables or ribbons typically have connectors located on each end to connect them to other fiber optic cables or ribbons or to peripheral devices, and the connectors are high precision devices that position the optical fibers for optimal connection.

In order to pass light signals through optical fibers, the end face of the connector (from which a ferrule and optical fibers extend) must abut an adjacent connector in a specific manner. The high tolerances required of the parts to make these connections lead to precise shaping of the ends of the optical fibers via cleaving, cutting, and/or polishing. Apex offset, radius of curvature, fiber protrusion/recession, and angularity are all geometric parameters of the optical fiber end face that play into the quality of the signal passing through it. Final test measurements for back reflection and insertion loss are typically used as the final checks to determine the quality of the geometry (as well as the alignment, cleanliness, and surface finish of the finished cable.) As such, the end face is usually cleaved, cut and/or polished to exacting standards so as to produce a finished product with minimal back reflection and loss. For example, it is often necessary to cleave, cut, and/or polish the end face of the connector to a precise length, i.e., so the end face projects a predetermined amount from a reference point such as a shoulder on the fiber optic connector within a predetermined tolerance. Fiber optic cables having multiple optical fibers can also be cleaved, cut, and/or polished to produce a particular performance specification.

Optical fiber polishers typically include a rotating platen and a polishing mechanism, such as a polishing arm mechanism, that positions and supports the connectors during the polishing process. Typically, the end face is lowered onto a film resting on the platen, and depending upon the film, the speed of the platen, the pressure applied, and its duration, acquires a product suitable for a particular application. Optical fiber polishers generally include a fixture coupled to the arm mechanism that is capable of holding and gripping one or more fiber optic connectors and advancing them under controlled conditions of speed and force to engage a plurality of fiber optic ends into engagement with a polishing member such as a rotatable platen having an abrasive surface (e.g., a platen with a pad having a film with an abrasive surface positioned thereon).

The manufacturing process for building a finished fiber optic connector typically involves polishing it at various speeds and pressures using various polishing film sizes. Typically, the process will start with a more aggressive film of higher abrasive particle size at lower speeds and pressures and work towards smaller particle size films at faster speeds and higher pressures.

In some optical fiber polishers, the platen may stop at any random position at the end of a polishing step. However, the random position stops complicate automation of the polishing process, which involves robotic picking and placing the rubber pads on top of the platen.

For the reasons stated above and for other reasons stated below, which will become apparent to those skilled in the art upon reading and understanding the present specification, there is a need in the art for an improved optical fiber polisher that includes indexed platen stopping features.

BRIEF SUMMARY OF THE INVENTION

The above-mentioned problems associated with prior devices are addressed by examples of the present invention and will be understood by reading and understanding the present specification. The following summary is made by way of example and not by way of limitation. It is merely provided to aid the reader in understanding some of the aspects of the invention.

In one example, an optical fiber polisher comprises a polishing mechanism, a platen, and a memory for storing operational parameters entered by a user. The optical fiber polisher includes a processor to control a stopping position of the platen at an end of a polishing step based on the operational parameters.

BRIEF DESCRIPTION OF THE DRAWINGS

The present invention can be more easily understood, and further advantages and uses thereof can be more readily apparent, when considered in view of the detailed description and the following Figures in which.

In accordance with common practice, the various described features are not drawn to scale but are drawn to emphasize specific features relevant to the present invention. Reference characters denote like elements throughout the Figures and the text.

DETAILED DESCRIPTION OF THE INVENTION

In the following detailed description, reference is made to the accompanying drawings, which form a part hereof, and in which is shown by way of illustration examples in which the inventions may be practiced. These examples are described in sufficient detail to enable those skilled in the art to practice the invention, and it is to be understood that other examples may be utilized and mechanical changes may be made without departing from the spirit and scope of the present invention. The following detailed description is, therefore, not to be taken in a limiting sense, and the scope of the present invention is defined only by the claims and equivalents thereof.

Figure 1:
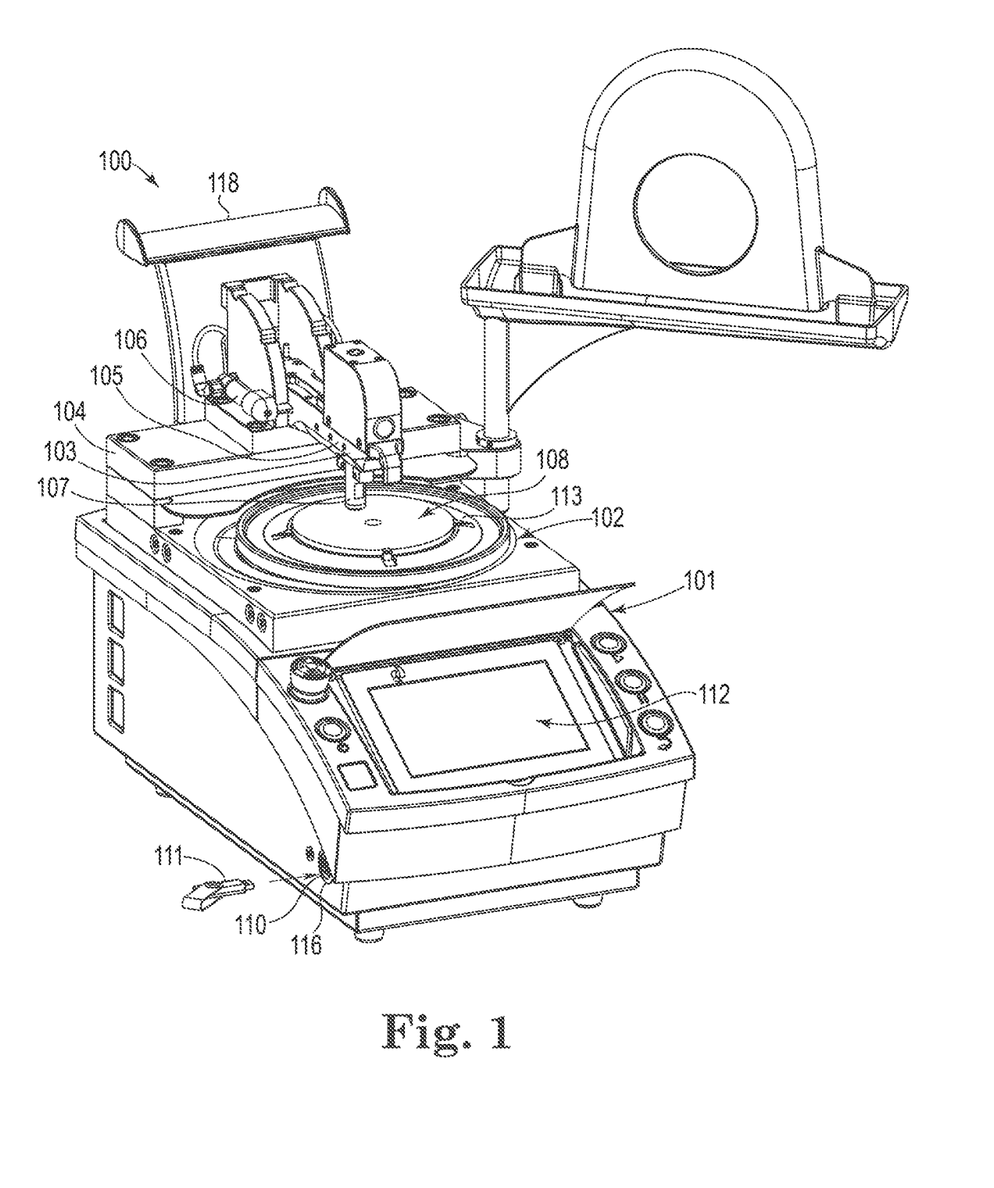
FIG. 1 is diagram illustrating a perspective view of an optical fiber polisher according to one example.

FIG. 1 is a diagram illustrating a perspective view of an optical fiber polisher 100 according to one example. Optical fiber polisher 100 may be of the type of optical fiber polisher shown and described in U.S. Pat. Nos. 7,738,760, 8,708,776, and 10,981,257, which are hereby incorporated by reference. Optical fiber polisher 100 may be an Optical Fiber Polishing Machine APM Model HDC-5400 by Domaille Engineering, LLC of Rochester, Minnesota Although optical fiber polisher 100 is generally shown and described, it is recognized that other suitable types of polishers could be used with the present disclosure.

Generally, the polisher 100 includes a polishing unit 102 comprising a pneumatic overarm assembly 103, a platen assembly 108 including a platen 113 rotatably supported by a stage 109 (FIG. 2), a processor 302 (FIG. 3), a porting device 110 for a portable memory device 111, and an input device 112. In one example, the porting device includes a USB port, and the portable memory device 111 is a USB drive. A housing 101 supports and aligns the polishing unit 102, the processor 302, and the input device 112 in an operative position. An opening 116 is positioned along one side of the housing 101 to allow the portable memory device 111 to access the porting device 110. A cable management attachment 118 is connected to the back of the housing 101 for supporting fiber optic cables undergoing a polishing process.

The pneumatic overarm assembly 103 includes an overarm 105 hingedly secured along one end to a base 104, the overarm 105 rotatable about the hinged end. A pair of pneumatic cylinders 106 are coupled to the overarm 105, opposing rotational movement thereof. A mandrel 107 extends downward from the overarm 105 and is configured and arranged, as is well known in the art, to connect to a mounting tube of a fixture.

The polisher 100 maintains rigid control of each polishing process through feedback mechanisms that control the operation of both the platen assembly 108 and the pneumatic overarm assembly 103. The feedback mechanisms communicate with the processor 302 to continuously monitor the performance of the platen assembly 108 and the pneumatic overarm assembly 103 and ensure that both are functioning at their set levels. In some examples, the processor 302 communicates with the porting device 110, the input device 112, and a USB port for a keyboard to enable rapid programming of the polisher 100. The input device 112 also serves as a visual indicator of actual operating parameters. In operation according to one example, processor 302 causes platen 113 to move, and causes overarm 105 to apply a downward force on a fixture holding one or more fiber optic connectors, which causes the end faces of the fiber optic connectors to be pressed into a polishing film resting on the platen 113.

Figure 2:
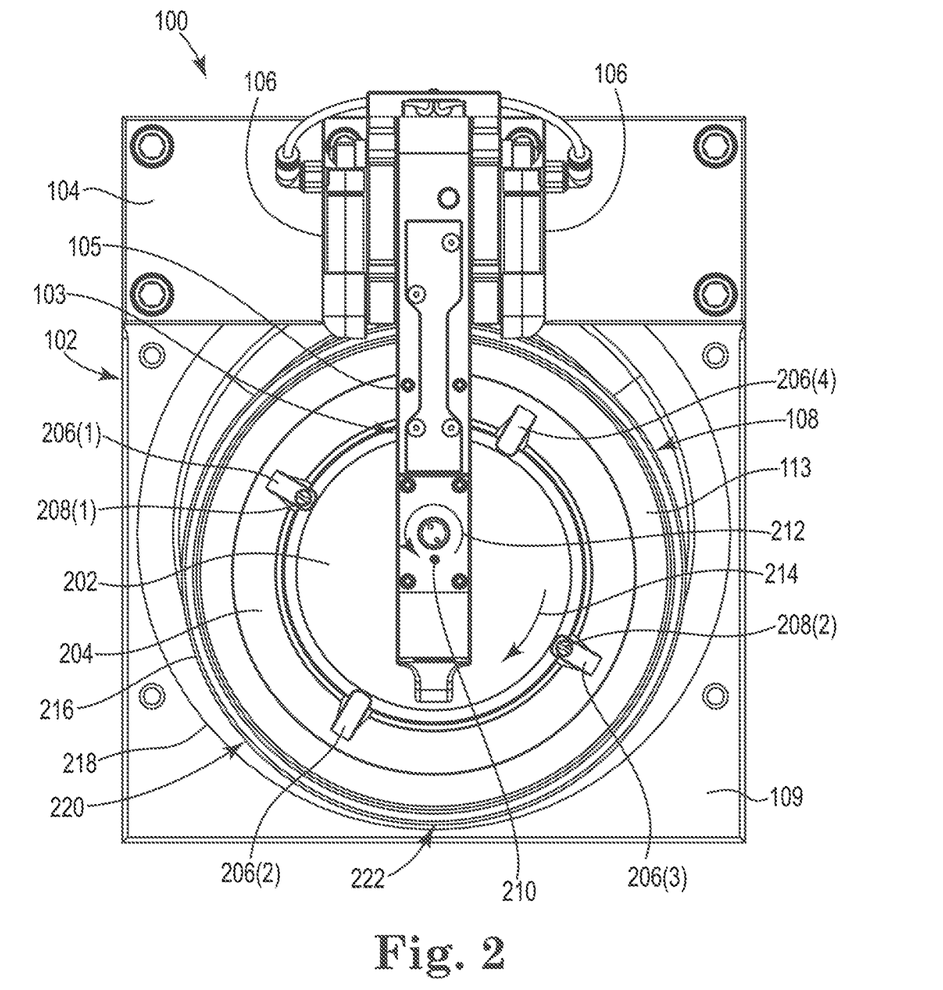
FIG. 2 is a diagram illustrating a top view of a portion of the optical fiber polisher shown in FIG. 1 according to one example.

FIG. 2 is a diagram illustrating a top view of a portion of the optical fiber polisher 100 shown in FIG. 1 according to one example. As shown in FIG. 2, the platen 113 includes a disk 202 with a circular outer perimeter that is surrounded by a rim 204. Four slots 206(1)-206(4) (collectively referred to as slots 206) are formed in the rim 204 at an inner perimeter of the rim 204 adjacent the disk 202. The slots 206 are spaced 90 degrees apart from each other around the inner perimeter of the rim 204. Two pad lock pins 208(1) and 208(2) (collectively referred to as pad lock pins 208) are respectively positioned in slots 206(1) and 206(3) at an edge of the slots that is directly adjacent to the disk 202. The pad lock pins 208 are positioned 180 degrees apart from each other around the inner perimeter of the rim 204. Prior to polishing, a pad is placed over the disk 202 and a film with an abrasive surface is secured to a top surface of the pad. The pad lock pins 208 may be used to securely hold the pad and film on the disk 202. The slots 206(2) and 206(4) are sized to allow a manual prying tool to reach under the pad for removal of the pad and film if it becomes stuck to the disk.

A platen motor 311 (FIG. 3) may be used to cause movement of platen 113. In one example, the movement of platen 113 includes translational movement, as indicated by arrow 212, as well as rotational movement, as indicated by arrow 214. In an example, the translational movement involves moving the platen 113 in a repeating pattern (e.g., circular pattern) so that a central axis 210 of the platen 113 revolves around a central axis of the mandrel 107 (FIG. 1). An outer perimeter 218 of a circular opening 220 formed in the stage 109 defines the limit of the translational movement of the platen 113 such that no portion of the platen 113 moves beyond the outer perimeter 218 during the translational movement. The position of the platen 113 at any given time may be identified based on the point of the outer perimeter 216 of the platen 113 that is closest to the outer perimeter 218. As shown in FIG. 2, this point is at position 222, which may be considered a six o'clock position or a 180 degree position, for example. As the translational movement of the platen 113 in a circular pattern continues, the position 222 will move around the perimeter 218. The position of the pad lock pins 208 may also be identified. For example, in FIG. 2, pad lock pin 208(1) is at a ten o'clock position, and pad lock pin 208(2) is at a four o'clock position.

In an example, in addition to the translational movement described above, the movement of platen 113 may include rotational movement in which the platen 113 rotates about its central axis 210 as indicated by arrow 214. In an example, the translational movement of platen 113 in a circular pattern is in a counterclockwise direction, and the rotational movement of platen 113 is in a clockwise direction. In other examples, other directions may be used, and the directions may be specified as user input to the optical fiber polisher 100.

Figure 3:
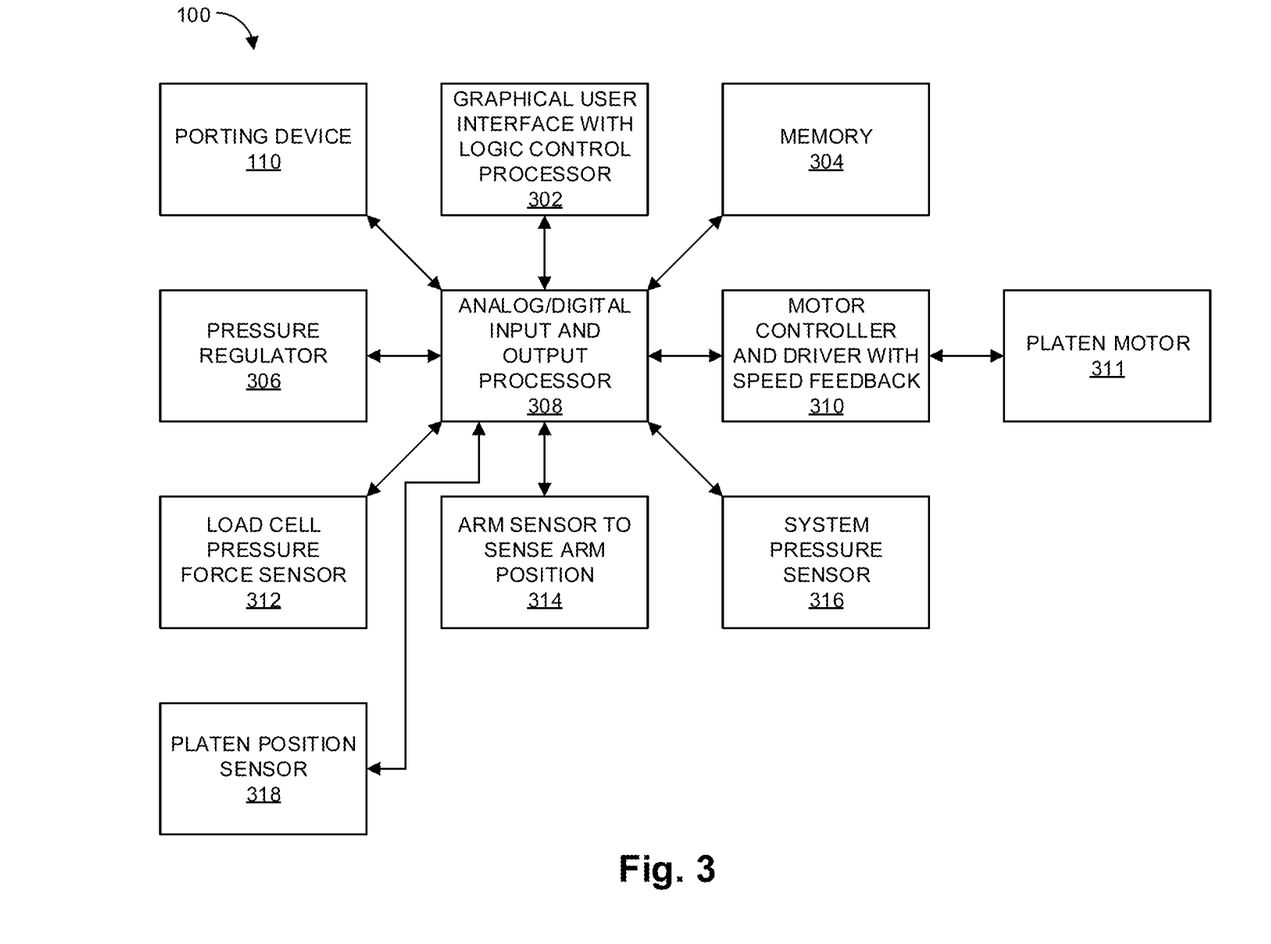
FIG. 3 is an electrical block diagram illustrating elements of the optical fiber polisher shown in FIG. 1 according to one example.

FIG. 3 is an electrical block diagram illustrating elements of the optical fiber polisher 100 shown in FIG. 1 according to one example. Optical fiber polisher 100 includes porting device 110, graphical user interface with logic control processor 302 (also referred to herein as "processor 302"), memory 304, pressure regulator 306, analog/digital input and output processor 308, motor controller and driver with speed feedback 310, platen motor 311, load cell pressure force sensor 312, arm sensor 314, system pressure sensor 316, and platen position sensor 318.

Graphical user interface with logic control processor 302 includes a Central Processing Unit (CPU) or another suitable processor. In one example, memory 304 stores machine readable instructions executed by the processor for operating polisher 100. Memory 304 includes any suitable combination of volatile and/or non-volatile memory, such as combinations of Random Access Memory (RAM), Read-Only Memory (ROM), flash memory, and/or other suitable memory. These are examples of non-transitory computer readable storage media. The memory 304 is non-transitory in the sense that it does not encompass a transitory signal but instead is made up of at least one memory component to store machine executable instructions for performing techniques described herein. Memory 304 may store one or more modules, and the processor may execute instructions of the modules to perform techniques described herein.

In one example, the various subcomponents or elements of the polisher 100 may be embodied in a plurality of different systems, where different modules may be grouped or distributed across the plurality of different systems. To achieve its desired functionality, polisher 100 may include various hardware components. Among these hardware components may be a number of processing devices, a number of data storage devices, a number of peripheral device adapters, and a number of network adapters. These hardware components may be interconnected through the use of a number of busses and/or network connections. The processing devices may include a hardware architecture to retrieve executable code from the data storage devices and execute the executable code. The executable code may, when executed by the processing devices, cause the processing devices to implement at least some of the functionality disclosed herein.

In one example, the processor 302 communicates with porting device 110 for a portable memory device 111. The porting device 110 may include a slot for supporting communication between the processor 302 and the portable memory device 111. The porting device 110 may be any device used to support communication between the processor 302 and a portable memory device. The porting device 110 may include, but is not limited to, USB, a CDROM drive, a memory slot, a disk drive, and a hard drive.

In one example, the input device 112 shown in FIG. 1 includes a graphical user interface with logic control processor 302 to receive user input. The input device 112 comprises an interactive display system in which a touch-sensitive screen is used as a projection surface. Control signals are generated by the touch-sensitive screen responsive to user applied pressure. The user can enter and edit information by touching the screen. The polisher 100 may also include a USB port that connects to a keyboard to receive user input. It is not intended that this disclosure be limited by the above-described input devices. A person skilled in the art can readily appreciate that there are a number of input devices that can be implemented to allow a user to interface with the processor, including a keypad, a mouse, a switch, and buttons.

To perform a polishing process, operational parameters such as process time, platen speed, pressure, film type, pad type, lubricant type, and platen stop position may be entered for each step of the polishing process. The process of inputting this information into the polisher 100 may be performed by scrolling through a plurality of screens on the input device 112 and selecting from a menu of parameters. Once inputted, the procedure can be saved into memory 304 and used by the processor 302 at a later date. Alternatively, the porting device 110 may be utilized to download an inputted polishing procedure onto a portable memory device 111. Once stored onto a portable memory device 111, the polishing process can be downloaded onto another polisher device, or downloaded onto a computer wherein the process may be transported to another site, such as by e-mail.

The processor 302 communicates with a plurality of sensors and feedback mechanisms to monitor and control the polishing process in accordance with the operational parameters entered by a user. The processor 302 communicates with elements of the polisher 100 to control polishing fixture pressure, platen rotational speed, and duration of the polishing process. The arm sensor 314 senses the position of the overarm 105, and transmits this sensed information to the processor 302 via processor 308. The system pressure sensor 316 continually senses the air pressure entering the polisher 100, and transmits this sensed information to the processor 302 via the processor 308. Based on this information, the processor 302 may determine a current air pressure. The processor 302 may then determine if the current air pressure is greater than an upper threshold or less than a lower threshold, in which case the processor 302 may generate an alarm signal.

Processor 302 may automatically adjust arm contact pressure based on operational parameters entered by a user. Processor 302 may continually adjust the pressure applied by the overarm 105 through a feedback mechanism that includes the load cell pressure force sensor 312. The load cell pressure force sensor 312 continually senses the amount of force the overarm 105 is applying downward on the fiber optic connector holding fixture, and transmits this sensed information to the processor 302 via the processor 308. Based on this information, the processor 302 may determine a current contact pressure. The processor 302 may then determine if the current contact pressure is greater or less than the user-selected pressure for the polishing procedure. The processor 302 corrects any deviations by communicating with the pressure regulator 306, and causing the pressure regulator 306 to increase or decrease the flow of air into the cylinders 106, which correspondingly increases or decreases the downward force applied by the overarm 105.

Processor 302 may automatically adjust platen speed based on operational parameters entered by a user. Processor 302 may continually adjust the rotational speed of the platen 113 through a feedback mechanism that includes the motor controller and driver with speed feedback 310. The motor controller and driver with speed feedback 310 controls and drives the platen motor 311 to cause movement of the platen 113. The motor controller and driver with speed feedback 310 also continually senses the rotational speed of the platen 113, and transmits this sensed information to the processor 302 via the processor 308. Based on this information, the processor 302 may determine a current rotational speed value. The processor 302 may then determine if the current rotational speed value is greater or less than the user-selected speed for the polishing procedure. The processor 302 corrects any deviations by communicating with the motor controller and driver with speed feedback 310 to increase or decrease the rotational speed of the platen 113.

The manufacturing process for building a finished fiber optic connector typically involves polishing it at various speeds and pressures using various polishing film sizes. Typically, the process will start with a more aggressive film of higher abrasive particle size at lower speeds and pressures and work towards smaller particle size films at faster speeds and higher pressures. How the polishing steps start and stop are important in that the fragile fibers are under higher stress levels at those times. If a sharp somewhat pointed fiber is stuck into a polishing film and it starts moving too suddenly under too high of a pressure, then the fiber may crack or break off. In similar fashion, as the polishing step finishes and the polishing machine comes to a stop, it is better to slowly and gradually drop the pressure and speed as to minimize the amount of side loaded forces that are seen by the fiber optic as things decelerate. Stopping suddenly can jar the fragile glass pieces and can crack them.

To address these issues, the operational parameters of polisher 100 that may be entered by a user may include parameters that allow the user to ramp up the pressure and speed at the beginning of each polishing step, ramp down the pressure and speed at the end of each polishing step, and also to start the movement of the polishing platen before applying pressure to the fixture or stop the rotating platen after the pressure has been ramped down or totally removed. The operational parameters allow the user to program in a pressure ramp and pressure drop at the start and end of each of the polishing steps, as well as a platen speed ramp and drop. These are all individual parameters that the user can program for as long as a maximum ramp duration (e.g., 60 seconds). Pressure can be ramped up to a user-specified maximum pressure value within an allowed pressure range (e.g., 0-24 lbs.) across a user-specified pressure ramp up duration (e.g., 0-60 seconds), as well as be ramped down across a user-specified pressure ramp down duration (e.g., 0-20 seconds). Similarly, the platen speed can be ramped up to a user-specified maximum speed value within an allowed speed range (e.g., 0-200 RPM) across a user-specified speed ramp up duration (e.g., 0-60 seconds), as well as be ramped down across a user-specified speed ramp down duration (e.g., 0-20 seconds).

In one example, processor 302 uses a linear scaling to perform the ramp up and ramp down of pressure and speed. For example, the processor 302 may divide the magnitude of the total ramp up or total ramp down by the duration of the ramp up or ramp down, and then raise or drop the speed/pressure as needed per time interval (e.g., once per second) to achieve the user-specified linear ramp.

In one example, the operational parameters of polisher 100 that may be entered by a user include at least one parameter that allows the user to start the polishing platen 113 prior to applying downward pressure to the fixture. This feature helps reduce side loaded forces on the fragile fiber optic components when starting the polishing processes. By starting the rotating platen 113 first before downward pressure is applied to the fiber holding fixture, the fibers will have lower applied stresses at startup. Because of the lower stresses, they will have a lower likelihood of cracking from the higher static frictional forces holding them in position. In one example, the user-specified operational parameters allow the user to delay the downward pressure forces for a user-specified delay period within an allowed delay period range (e.g., 0-20 seconds) while the rotational ramp of the polishing platen begins.

In one example, the operational parameters of polisher 100 that may be entered by a user include at least one parameter that allows the user to select, for each polishing step, the rotational motion direction (e.g., either clockwise or counterclockwise) of the polishing platen 113 for that polishing step. In one example, the at least one parameter to select the rotational motion direction has a default value indicating a clockwise rotational motion direction for all polishing steps, but this default may be changed by a user to a counterclockwise rotational motion direction for any or all of the polishing steps.

In one example, the operational parameters of polisher 100 that may be entered by a user include at least one parameter that allows the user to select, for each polishing step after the first polishing step, whether that polishing step will be automatically started upon the completion of the immediately preceding polishing step. In one example, the at least one parameter to select whether the polishing step will automatically start has a default value indicating that the polishing step will not automatically start (i.e., the step must be manually initiated by the user after completion of the preceding polishing step). Thus, none of the polishing steps will start automatically unless the user changes the default value for any or all of the polishing steps after the first polishing step. In one example, the default value for the first polishing step is not changeable, and is always manually started.

In some optical fiber polishers, the platen may stop at any random position at the end of a polishing step. However, the random position stops complicate automation of the polishing process, which may involve robotic picking and placing the rubber pads on top of the platen. In contrast, some examples disclosed herein allow a user to specify a stop position for the platen, which simplifies the automated polishing process and makes it more efficient. For example, the platen may always be stopped at the same stop position, which is known by the robot.

Processor 302 may automatically cause platen 113 to stop at a user-specified position at the end of a polishing step based on operational parameters entered by a user. Platen position sensor 318 senses the position of the platen 113 as it passes by and transmits this sensed position information to the processor 302 via the processor 308. In other embodiments, the position sensor 318 is an encoder type sensor that continually senses the current position of the platen as it moves and transmits this sensed position information to the processor 302 via the processor 308. In either embodiment, upon feedback from the platen position sensor 318, the platen position is continually known as positional index information is fed back to the processor throughout the motor revolution. As the platen 113 decelerates near the end of a polishing step, processor 302 may continually monitor the position of the moving platen 113 based on the received position information, continually compare the current position with a user-specified stop position, and cause the platen 113 to stop at the user-specified stop position at the end of the polishing step.

Figure 4:
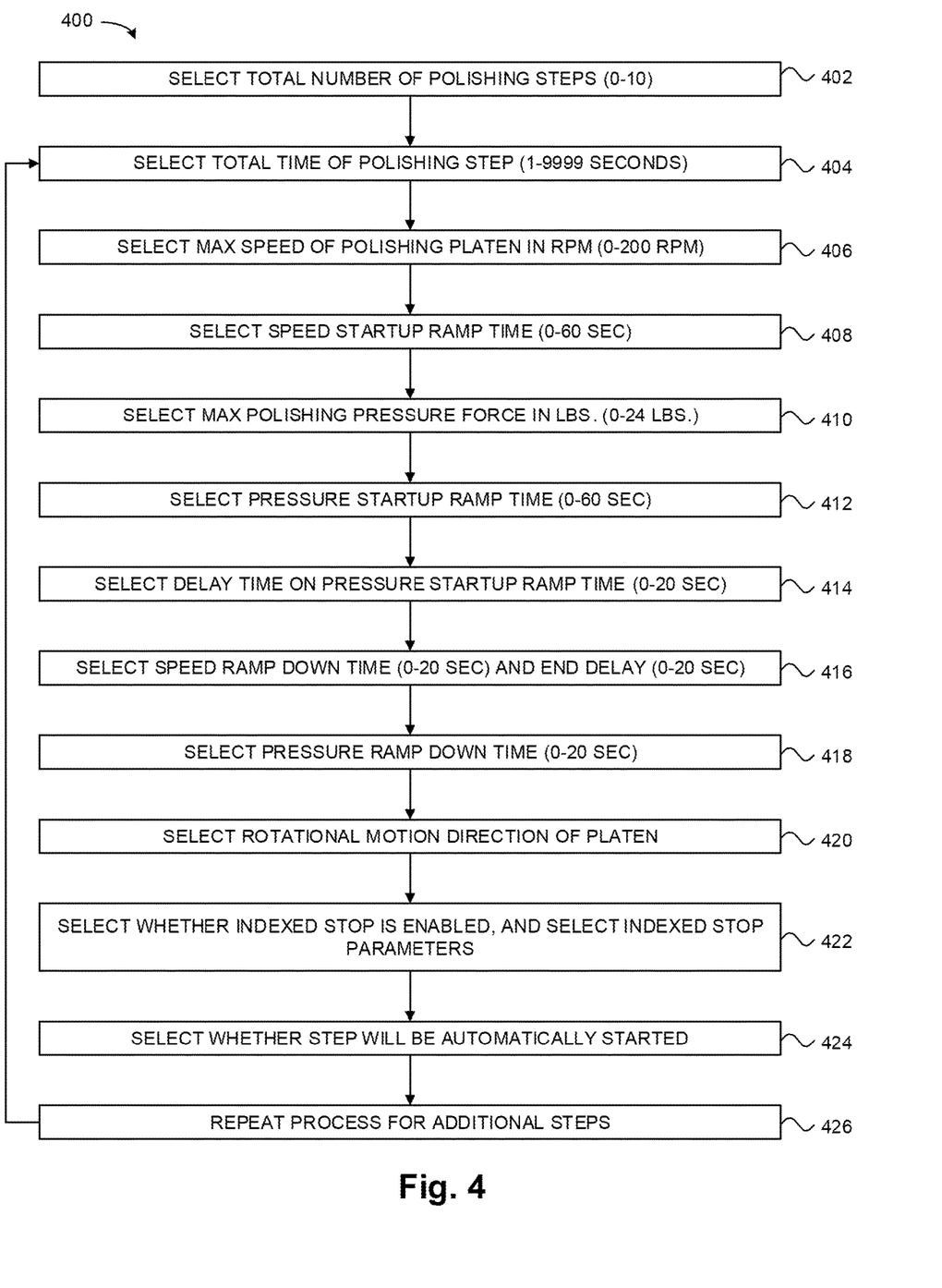
FIG. 4 is a flow diagram illustrating a method for entering operational parameters and generating a polishing recipe for the optical fiber polisher shown in FIG. 1 according to one example.

FIG. 4 is a flow diagram illustrating a method 400 for entering operational parameters and generating a polishing recipe for the optical fiber polisher 100 shown in FIG. 1 according to one example. At 402 in method 400, the graphical user interface 302 prompts a user to select a total number of polishing steps (e.g., 0-10 steps) to be performed by polisher 100. After the selection at 402, the method 400 moves to 404, where the graphical user interface 302 prompts a user to select a total time of the polishing step (e.g., 1-9999 seconds). After the selection at 404, the method 400 moves to 406, where the graphical user interface 302 prompts a user to select the maximum (max) speed of the polishing platen 113 in RPM (e.g., 0-200 RPM). After the selection at 406, the method 400 moves to 408, where the graphical user interface 402 prompts a user to select the speed startup ramp time (e.g., 0-60 seconds).

After the selection at 408, the method 400 moves to 410, where the graphical user interface 302 prompts a user to select the maximum polishing pressure force in pounds (lbs) (e.g., 0-24 lbs). After the selection at 410, the method 400 moves to 412, where the graphical user interface 302 prompts a user to select a pressure startup ramp time (e.g., 0-60 seconds). After the selection at 412, the method 400 moves to 414, where the graphical user interface 302 prompts a user to select a delay time on pressure startup ramp time (e.g., 0-20 seconds). After the selection at 414, the method 400 moves to 416, where the graphical user interface 302 prompts a user to select a speed ramp down time (e.g., 0-20 seconds) and an end delay value (e.g., 0-20 seconds). After the selections at 416, the method 400 moves to 418, where the graphical user interface 302 prompts a user to select a pressure ramp down time (e.g., 0-20 seconds). After the selection at 418, the method 400 moves to 420, where the graphical user interface 302 prompts a user to select a rotational motion direction (e.g., clockwise or counterclockwise) of the polishing platen 113.

After the selection at 420, the method 400 moves to 422, where the graphical user interface 302 prompts a user to select whether indexed stop is enabled, and if it is enabled, the interface 302 prompts a user to select indexed stop parameters. In one example, the indexed stop parameters that may be entered at 422 include a platen indexed stop position (e.g., 0-360 degrees, with a resolution of 1 degree), which may have a default value (e.g., 180 degrees) if a different value is not entered by a user; a platen indexed stop speed (e.g., 10-50 RPM); a stop mode for stopping the platen 113 (e.g., a first mode in which the platen 113 comes to a normal full stop and is then moved to the selected platen stop position, or a second mode in which the platen 113 is immediately moved to the selected platen stop position during deceleration with no intermediate stop); and a parameter to enable or disable tracking of the locations of the pad lock pins 208 (FIG. 2). After the selection at 422, the method 400 moves to 424, where the graphical user interface 302 prompts a user to select whether the current polishing step will be automatically started upon completion of the immediately preceding polishing step. After the selection at 424, the method 400 moves to 426, which indicates that the process is repeated for additional polishing steps, and the method 400 returns to 404.

The operational parameters entered by a user in method 400 represent a recipe for polishing, which is used by processor 302 to cause polisher 100 to perform a polishing process in accordance with the parameters. Processor 302 causes the polisher 100 to perform the number of polishing steps selected at 402 in method 400, with each step lasting a duration specified at 404 in method 400. For each of the polishing steps, processor 302 ramps up the rotational speed of the platen 113 from 0 RPM to the maximum speed value entered at 406 over a period of time specified at 408. For each of the polishing steps, processor 302 ramps up the downward pressure force applied by the overarm 105 from 0 lbs to the maximum polishing pressure force value entered at 410 over a period of time specified at 412. If a user selects zero for the delay value at 414, the processor 302 causes the ramp up of the downward pressure force to begin at the same time as the ramp up of the rotational speed of the platen 113. If a user selects a non-zero value for the delay value at 414, the processor 302 causes the start of the ramp up of the downward pressure force to be delayed by that non-zero value after the start of the ramp up of the rotational speed of the platen 113.

At the end of each of the polishing steps, processor 302 ramps down the rotational speed of the platen 113 from the speed value entered at 406 to 0 RPM over the ramp down period of time specified at 416. At the end of each of the polishing steps, processor 302 ramps down the downward pressure force applied by the overarm 105 from the pressure value entered at 410 to 0 lbs. over the period of time specified at 418. If a user selects zero for the end delay at 416, the ramp down of the platen speed and the ramp down of the pressure end at the same time. If a user selects a non-zero value for the end delay at 416, the ramp down of the platen speed ends by the selected non-zero number of seconds after the end of the ramp down of the pressure. For each polishing step, the rotational motion direction of the platen 113 is determined by the selection made by the user at 420. For each of the polishing steps in which indexed stop has been enabled at 422, processor 302 performs an indexed stop method based on the indexed stop parameters entered at 422. For each polishing step, whether that polishing step is automatically started upon completion of the preceding polishing step is determined by the selection made by the user at 424.

Figure 5:
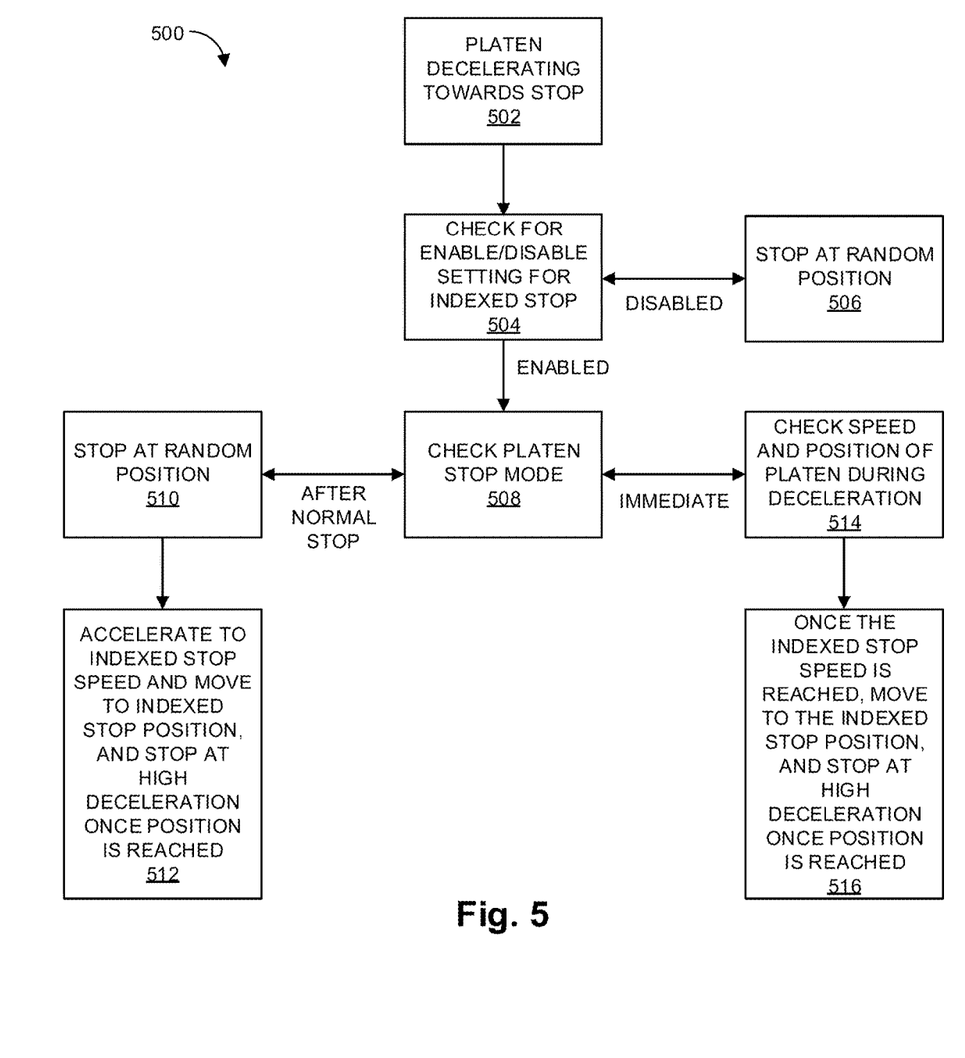
FIG. 5 is a flow diagram illustrating a method for performing an indexed stop method with the optical fiber polisher shown in FIG. 1 according to one example.

FIG. 5 is a flow diagram illustrating a method 500 for performing an indexed stop method with the optical fiber polisher 100 shown in FIG. 1 according to one example. Method 500 may be performed when indexed stop has been enabled at 422 in method 400 (FIG. 4). The method 500 begins at 502 with the platen 113 decelerating towards stop at the end of a polishing step. The method 500 includes, at 504, checking whether indexed stop has been enabled or disabled (e.g., which may be selected at 422 in method 400). If it is determined at 504 that the indexed stop has been disabled, the method 500 moves to 506. The method 500 includes, at 506, stopping the platen 113 in a random position in a normal manner.

If it is determined at 504 that the indexed stop has been enabled, the method 500 moves to 508. The method 500 includes, at 508, checking the platen stop mode that has been selected by the user (e.g., at 422 in method 400). If it is determined at 508 that the first mode has been selected (i.e., the mode in which the platen 113 comes to a normal full stop and is then moved to the selected platen stop position), the method 500 moves to 510. The method 500 includes, at 510, stopping the platen 113 in a random position in a normal manner, and the method 500 moves to 512. The method 500 includes, at 512, accelerating the platen 113 from the stopped state to the indexed stop speed (e.g., which may be selected at 422 in method 400) to move the platen 113 at the indexed stop speed to the indexed stop position (e.g., which may be selected at 422 in method 400), and stopping the platen 113 at high deceleration once the indexed stop position has been reached.

If it is determined at 508 that the second mode has been selected (i.e., the mode in which the platen 113 is immediately moved to the selected platen stop position during deceleration with no intermediate stop), the method 500 moves to 514. The method 500 includes, at 514, continually checking the speed and position of the platen 113 during deceleration. The method 500 includes, at 516, continuing deceleration of the platen 113 until the indexed stop speed is reached, and then moving the platen 113 at the indexed stop speed to the indexed stop position, and stopping the platen 113 at high deceleration once the indexed stop position has been reached.

As described above with reference to FIG. 2, platen motor 311 (FIG. 3) may be used to cause movement of platen 113, and the movement of platen 113 may include translational movement in a circular pattern, as indicated by arrow 212, as well as rotational movement, as indicated by arrow 214. The translational and rotational movement may be accomplished using a harmonic drive device. The sensing of the position of the platen 113 may include sensing position changes based on either or both of the translation movement and the rotational movement. In an example, platen motor 311 is a stepper motor with precise stepping controls and with sufficient torque to drive the platen 113 without a gearbox. In an example, each rotation of the stepper motor corresponds to one completion of the circular pattern of translational movement by the platen 113. Thus, by sensing the position of the shaft of the stepper motor, the corresponding position of the platen 113 along its circular translational movement path may be determined. In an example, platen position sensor 318 senses the position of the shaft of the platen motor 311, and the sensed current position of the shaft corresponds to a current position of the platen 113. The sensed position information of the shaft may be used by the processor 302 to cause the platen 113 to stop at a user-specified stop position. In an example, platen position sensor 318 generates a flag or other indication each time the motor shaft completes a full rotation, and then the exact position of the motor shaft may be determined based on the number of motor steps that have occurred since the last flag was generated. In other examples, platen motor 311 may be another type of motor, such as a servo motor or a DC brushless motor. It is noted that some of the elements shown in the figures may change based on the type of motor used for the platen motor 311. As an example, in some implementations, element 310 (FIG. 3) may not include speed feedback.

In an example, the rotational movement of the platen 113 is slower than the translational movement of the platen 113. For example, one complete rotation of the platen 113 may correspond to 120 completions of the circular pattern of translational movement. Since the current position of the platen 113 based on translational movement is tracked, and since the relationship between translational movement and rotational movement is known, the angular position of the slots 206 and/or pad lock pins 208 may be continually tracked based on the sensed translational movement. In this example, the user may specify a starting angular position of the slots 206 and/or pad lock pins 208. In other examples, the angular position of the slots 206 and/or pad lock pins 208 may be tracked using a camera/vision system during movement of the platen 113, or after the platen 113 has stopped. In other examples, other types of sensors and sensing methods may be used to facilitate stopping the platen 113 at a specific index at the end of a polishing step, including general or absolute encoders, cameras, rotary potentiometers, and other sensors (e.g., on or near the motor shaft or on or near the platen 113 itself).

Figure 6:
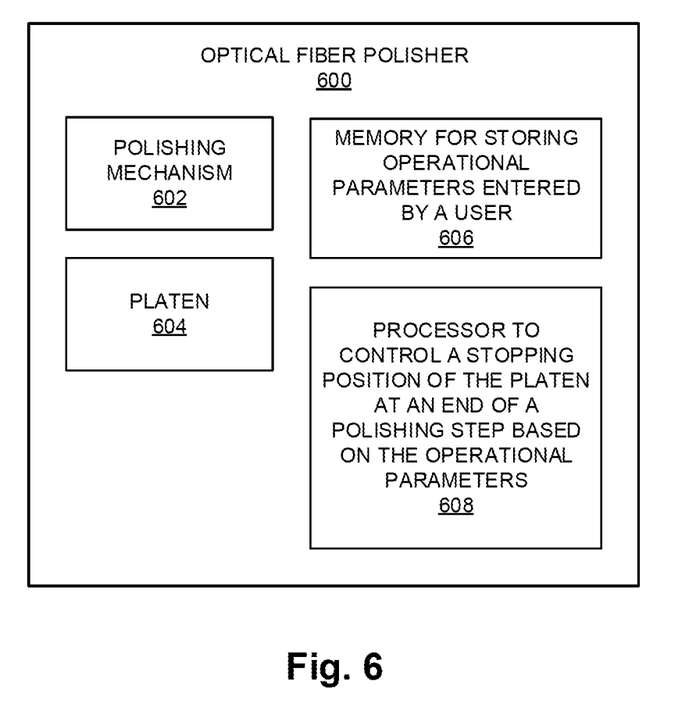
FIG. 6 is a block diagram illustrating an optical fiber polisher according to an example.

One example of the present disclosure is directed to an optical fiber polisher. FIG. 6 is a block diagram illustrating an optical fiber polisher 600 according to an example. Optical fiber polisher 600 includes a polishing mechanism 602, a platen 604, a memory 606 for storing operational parameters entered by a user, and a processor 608 to control a stopping position of the platen at an end of a polishing step based on the operational parameters.

The optical fiber polisher 600 may further include a platen motor to cause movement of the platen 604. Movement of the platen 604 may include translational movement in a repeating pattern and rotational movement. The translational movement may be in a repeating circular pattern in one of a clockwise direction or a counterclockwise direction, and the rotational movement may be in a direction that is opposite the direction of the translational movement. The translational movement may be in a repeating circular pattern in one of a clockwise direction or a counterclockwise direction, and the rotational movement may be in a direction that corresponds to the direction of the translational movement. The optical fiber polisher 600 may further include a sensor to continually sense a position of the platen 604, and the processor 608 may cause the platen 604 to stop at a predetermined position based on the operational parameters and the sensed position of the platen 604. The platen motor may be a stepper motor, and the sensor may continually sense a position of a shaft of the stepper motor using sensor feedback and stepper counts, and the position of the platen 604 may be determined based on a known relationship between an amount of movement of the shaft of the stepper motor and a corresponding amount of movement of the platen 604. The sensor may include at least one camera.

The movement of the platen 604 may include translational movement in a repeating pattern and rotational movement, and the sensor may sense position changes of the platen 604 associated with the translational movement. The processor 608 may determine an angular position of the platen 604 associated with the rotational movement based on a relationship between an amount of translational movement of the platen 604 and a corresponding amount of rotational movement of the platen 604.

The operational parameters may include a platen stop position parameter specified in degrees in the range of 0 to 360 degrees, and the processor 608 may cause the platen 604 to stop at the end of the polishing step at a position corresponding to the platen stop position parameter. The operational parameters may include a stop speed parameter, and the processor 608 may cause a change of a speed of movement of the platen 604 to a stop speed indicated by the stop speed parameter toward an end of the polishing step, and the processor 608 may cause a deceleration of the platen 608 from the stop speed to zero velocity to stop the platen 604 at a predetermined position at the end of the polishing step. The operational parameters may include a stop mode parameter, and in a first mode indicated by the stop mode parameter, the processor 608 may cause the platen 604 to stop at a random position, cause the platen 604 to accelerate from the random position to a stop speed indicated by the stop speed parameter, and cause a deceleration of the platen 604 from the stop speed to zero velocity to stop the platen 604 at the predetermined position at the end of the polishing step. In a second mode indicated by the stop mode parameter, the processor 608 may cause a deceleration of the platen 604 from an operating speed to a stop speed indicated by the stop speed parameter, and cause a deceleration of the platen 604 from the stop speed to zero velocity to stop the platen 604 at the predetermined position at the end of the polishing step with no intermediate stop. The optical fiber polisher 600 may be configured to perform a polishing process in a plurality of polishing steps, and each of the polishing steps may include a set of operational parameters that may vary from operational parameters of other ones of the polishing steps.

Figure 7:
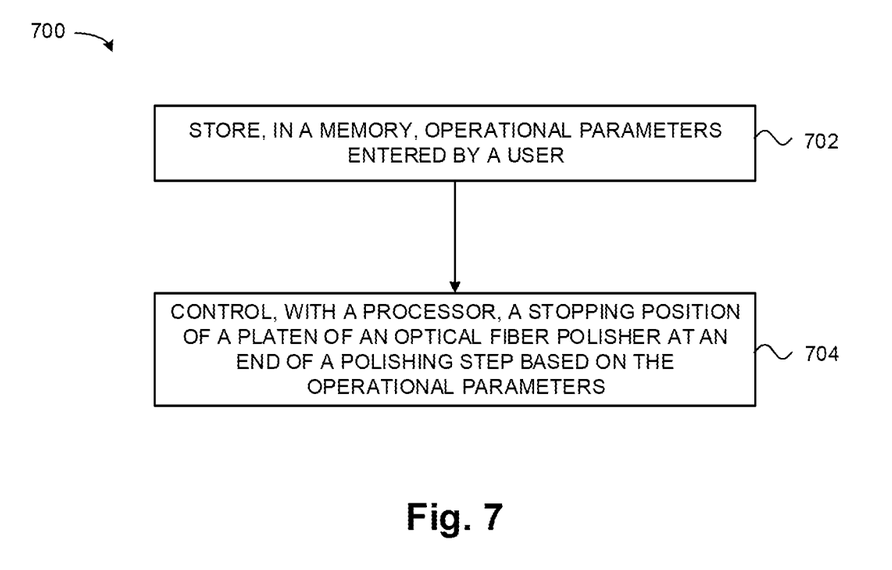
FIG. 7 is a flow diagram illustrating a method of optical fiber polishing according to one example.

Another example of the present disclosure is directed to a method of optical fiber polishing. FIG. 7 is a flow diagram illustrating a method 700 of optical fiber polishing according to one example. The method 700 includes, at 702, storing, in a memory, operational parameters entered by a user. The method 700 includes, at 704, controlling, with a processor, a stopping position of a platen of an optical fiber polisher at an end of a polishing step based on the operational parameters.

The method 700 may further include continually identifying a current position of the platen using a sensor; and causing, with the processor, the platen to stop at a position specified in the operational parameters, based on the continually identified position of the platen. The operational parameters in method 700 may include a platen stop position parameter specified in degrees in the range of 0 to 360 degrees, and the method 700 may further include causing, with the processor, the platen to stop at the end of the polishing step at a position corresponding to the platen stop position parameter. The operational parameters in method 700 may further include a stop mode parameter, and the method 700 may further include causing, with the processor, in a first mode indicated by the stop mode parameter, the platen to stop at a random position, causing the platen to accelerate from the random position to a predetermined speed, and causing a deceleration of the platen from the predetermined speed to zero velocity to stop the platen at a predetermined position at the end of the polishing step; and causing, with the processor, in a second mode indicated by the stop mode parameter, a deceleration of the platen from an operating speed to the predetermined speed, and causing a deceleration of the platen from the predetermined speed to zero velocity to stop the platen at the predetermined position at the end of the polishing step with no intermediate stop.

Figure 8:
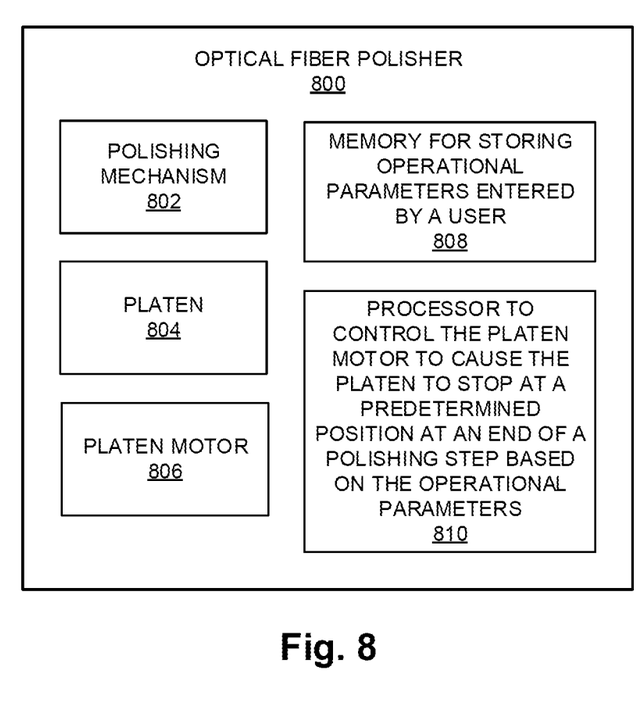
FIG. 8 is a block diagram illustrating an optical fiber polisher according to another example.

Another example of the present disclosure is directed to an optical fiber polisher. FIG. 8 is a block diagram illustrating an optical fiber polisher 800 according to another example. Optical fiber polisher 800 includes a polishing mechanism 802, a platen 804, a platen motor 806 to cause movement of the platen, a memory 808 for storing operational parameters entered by a user, and a processor 810 to control the platen motor 806 to cause the platen 804 to stop at a predetermined position at an end of a polishing step based on the operational parameters.

The movement of the platen 804 may include translational movement in a repeating pattern and rotational movement, and the optical fiber polisher 800 may further include: a sensor to continually sense changes in position of the platen 804 caused by at least one of the translational movement and the rotational movement, and the processor 810 may cause the motor 806 to stop the platen 804 at the predetermined position based on the operational parameters and the sensed changes in position of the platen 804.

The above specification, examples, and data provide a complete description of the manufacture and use of the composition of examples of the invention. Although specific examples have been illustrated and described herein, it will be appreciated by those of ordinary skill in the art that any arrangement, which is calculated to achieve the same purpose, may be substituted for the specific example shown. This application is intended to cover any adaptations or variations of the invention. Therefore, it is manifestly intended that this invention be limited only by the claims and the equivalents thereof.

The invention claimed is:

1. An optical fiber polisher, comprising:
   an overarm assembly configured to apply a downward force on a fixture holding one or more fiber optic connectors;
   a platen;
   a memory for storing operational parameters entered by a user, the operational parameters including a stop speed parameter, and
   a processor configured to change a speed of a movement of the platen to a stop speed indicated by the stop speed parameter toward an end of a polishing step, move the platen at the stop speed to a predetermined position, and cause a deceleration of the platen from the stop speed to zero velocity to stop platen at the predetermined position at the end of the polishing step.

2. The optical fiber polisher of claim 1, and further comprising:
   a platen motor to cause movement of the platen.

3. The optical fiber polisher of claim 2, wherein the movement of the platen includes a circular movement in a repeating pattern and rotational movement.

4. The optical fiber polisher of claim 3, wherein the circular movement is in a repeating circular pattern in one of a clockwise direction or a counterclockwise direction, and wherein the rotational movement is in a direction that is opposite the direction of the circular movement.

5. The optical fiber polisher of claim 3, wherein the circular movement is in a repeating circular pattern in one of a clockwise direction or a counterclockwise direction, and wherein the rotational movement is in a direction that corresponds to the direction of the circular movement.

6. The optical fiber polisher of claim 2, and further comprising:
   a sensor to continually sense a position of the platen, and wherein the processor is configured to stop the platen at the predetermined position based on the operational parameters and the sensed position of the platen.

7. The optical fiber polisher of claim 6, wherein the platen motor is a stepper motor, and wherein the sensor continually senses a position of a shaft of the stepper motor using sensor feedback and stepper counts, and wherein the position of the platen is determined based on a known relationship between an amount of movement of the shaft of the stepper motor and a corresponding amount of movement of the platen.

8. The optical fiber polisher of claim 6, wherein the sensor comprises at least one camera.

9. The optical fiber polisher of claim 6, wherein the movement of the platen includes circular movement in a repeating pattern and rotational movement, and wherein the sensor senses position changes of the platen associated with the circular movement.

10. The optical fiber polisher of claim 9, wherein the processor is configured to determine an angular position of the platen associated with the rotational movement based on a relationship between an amount of circular movement of the platen and a corresponding amount of rotational movement of the platen.

11. The optical fiber polisher of claim 1, wherein the operational parameters include a platen stop position parameter specified in degrees in the range of 0 to 360 degrees, and wherein the processor is configured to stop the platen at the end of the polishing step at the predetermined position corresponding to the platen stop position parameter.

12. The optical fiber polisher of claim 1, wherein the operational parameters include a stop mode parameter, and wherein, in a first mode indicated by the stop mode parameter, the processor is configured to stop the platen at a first position, cause the platen to accelerate from the first position to the stop speed indicated by the stop speed parameter, move the platen at the stop speed to the predetermined position and cause a deceleration of the platen from the stop speed to zero velocity to stop the platen at the predetermined position at the end of the polishing step.

13. The optical fiber polisher of claim 12, wherein, in a second mode indicated by the stop mode parameter, the processor is configured to cause a deceleration of the platen from an operating speed to a stop speed indicated by the stop speed parameter, and cause a deceleration of the platen from the stop speed to zero velocity to stop the platen at the predetermined position at the end of the polishing step with no intermediate stop.

14. A method, comprising:
   storing, in a memory, operational parameters entered by a user, the operational parameters including a stop mode parameter;
   causing, with a processor, in a first mode indicated by the stop mode parameter, the platen to stop at a first position toward an end of a polishing step, causing the platen to accelerate from the first position to a predetermined speed, causing the platen to move at the predetermined speed to a predetermined position, and causing a deceleration of the platen from the predetermined speed to zero velocity to stop the platen at the predetermined position at the end of the polishing step; and
   causing, with the processor, in a second mode indicated by the stop mode parameter, a deceleration of the platen from an operating speed to the predetermined speed toward an end of the polishing step, causing the platen to move at the predetermined speed to the predetermined position, and causing a deceleration of the platen from the predetermined speed to zero velocity to stop the platen at the predetermined position at the end of the polishing step with no intermediate stop.

15. The method of claim 14, and further comprising:
continually identifying a current position of the platen using a sensor; and
causing, with the processor, the platen to stop at the predefined position specified in the operational parameters, based on the continually identified position of the platen.

16. The method of claim 14, wherein the operational parameters include a platen stop position parameter specified in degrees in the range of 0 to 360 degrees, and wherein the method further comprises:
causing, with the processor, the platen to stop at the end of the polishing step at the predetermined position corresponding to the platen stop position parameter.

17. An optical fiber polisher, comprising:
an overarm assembly configured to apply a downward force on a fixture holding one or more fiber optic connectors;
a platen;
a platen motor to cause movement of the platen;
a memory for storing operational parameters entered by a user, the operational parameters including a stop speed parameter; and
a processor configured to change a speed of movement of the platen to a stop speed indicated by the stop speed parameter toward an end of a polishing step, move the platen at the stop speed to a predetermined position, and cause a deceleration of the platen from the stop speed to zero velocity to stop the platen at the predetermined position at the end of the polishing step.

18. The optical fiber polisher of claim 17, wherein the movement of the platen includes circular movement in a repeating pattern and rotational movement, and wherein the optical fiber polisher further comprises:
a sensor to continually sense changes in position of the platen caused by at least one of the circular movement and the rotational movement, and wherein the processor is configured to cause the motor to stop the platen at the predetermined position based on the operational parameters and the sensed changes in position of the platen.

* * * * *